United States Patent [19]
Yang et al.

[11] Patent Number: 5,453,799
[45] Date of Patent: Sep. 26, 1995

[54] UNIFIED MOTION ESTIMATION ARCHITECTURE

[75] Inventors: Kebing Yang, Gaithersburg; Kou-Hu Tzou, Potomac; Tahsin L. Lin, Ellicott City; Ashok K. Rao, Germantown, all of Md.

[73] Assignee: Comsat Corporation, Bethesda, Md.

[21] Appl. No.: 148,920

[22] Filed: Nov. 5, 1993

[51] Int. Cl.$^6$ ............................................ H04N 7/34
[52] U.S. Cl. ............................... 348/699; 348/402
[58] Field of Search .................... 348/699, 402, 348/407, 413, 416; H04N 7/137

[56] References Cited

U.S. PATENT DOCUMENTS

5,093,720  3/1992  Krause ...................... 348/699

Primary Examiner—Howard W. Britton
Attorney, Agent, or Firm—Sughrue, Mion, Zinn, Macpeak & Seas

[57] ABSTRACT

A video signal processor includes a motion vector estimation system having a first operating mode for performing frame-structure processing and a second operating mode for field-structure processing. The system includes N motion estimator units, each of the units receiving two respective time separated data blocks, wherein N units are operating during the first operating mode, wherein M of the N units are operating during the second operating mode and wherein (N–M) units provide motion estimating processing outside of an area of an image represented by the data blocks. According to one aspect of the present invention, N is an integer greater than 2 while M is an integer less than N.

6 Claims, 5 Drawing Sheets

UNIFIED MOTION ESTIMATION ARCHITECTURE

FIELD OF THE INVENTION

The present invention relates generally to an architecture for motion estimating and compensating. More specifically, the present invention relates to a flexible motion estimation and compensation architecture in a digital video signal processor. The present invention advantageously can perform motion estimation and compensation with respect to digital signal compression according to draft Moving Pictures Experts Group (MPEG-2) standard and other non-standard techniques.

BACKGROUND OF THE INVENTION

In the video compression field, the MPEG-1 standard has been used mainly for the video coding at rates around 1.5 Mbit/s, and is considered inappropriate for higher "broadcast quality" applications. To meet more demanding applications such as post-processing, and compression of sports and other challenging video sources, the draft MPEG-2 standard activity was initiated. The standard will provide for high quality video compression (typically at bit rates between 3–10 Mbit/s) and is expected to accommodate high definition television (HDTV) and be downward compatible with MPEG-1. While MPEG-1 assumes the source to be frame based, draft MPEG-2 attempts to take interlace effects into account and provide for a certain degree of adaptive frame/field processing to improve the compression.

Figure 1A:
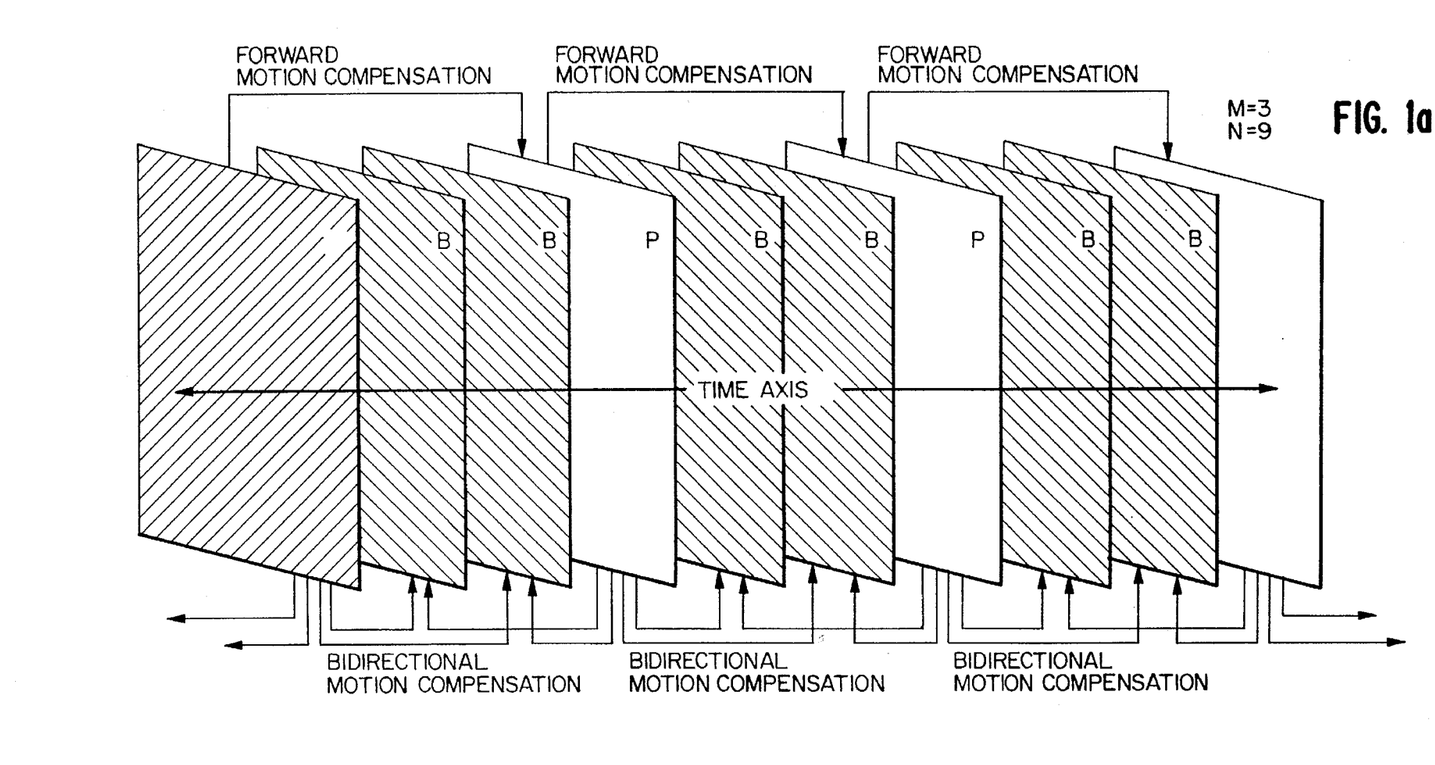
FIG. 1 includes a FIG. 1a illustrating the arrangement and processing order of several video signal units and a FIG. 1b illustrating temporal separation of video signal unit components.

The basic video unit in MPEG processing is a Group of Pictures (GOP) depicted in FIG. 1a. The GOP consists of:

(a) Intra (I) frames/fields which are coded purely spatially;

(b) Predicted (P) frames/fields which use previously coded I (or P) frames/fields as predictors; and (c) Bi-directional (B) frames/fields which use the closest previously occurring I (or P) frames/fields and or the closest I (or P) frames/fields in the future as predictor.

In the draft MPEG-2 standard, there are basically six levels (from level 0 to level 5) of processing. The levels differ in the choice of picture structure (frame-based or field-based) and in the motion prediction mode, i.e., forward, backward or bi-directional prediction. Generally speaking, the low levels use field-structure processing and forward prediction (which requires less hardware complexity), while high level modes tends to use frame-structure processing and bi-directional prediction. The higher level modes can also accommodate some form of field-based motion estimation within a frame picture structure.

Figure 1B:
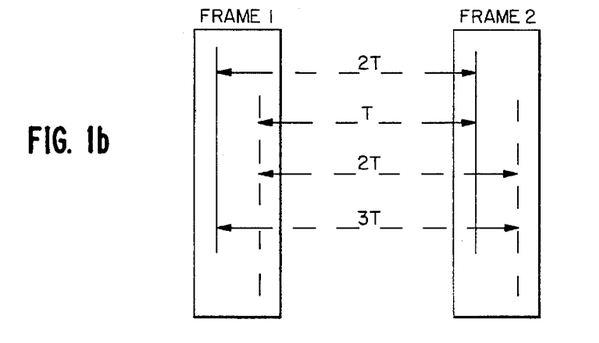

The draft MPEG-2 specification assumes implicitly that the processing level and the picture structure is fixed. Most proposed MPEG-2 motion estimation architectures operate in the frame-structure mode, obtaining frame motion vectors and in addition, separate motion vectors for the fields within the frame. However, the two fields within a frame cannot be used to predict each other. FIG. 1b clearly illustrates that every other field in a frame is separated in time by two field-periods from the closest field in the previous frame. In the case where fast motion is present in the video signal, the two-field interval can cause the displacement to exceed the capability of the motion estimator. It is therefore advantageous for each field to be predicted from the previously occurring field for such fast moving sources.

As expected, much effort has been expended in developing circuitry and methods for implementing MPEG-1 and its successor MPEG-2. U.S. Pat. No. 5,231,484, for example, describes a system for implementing an encoder suitable for MPEG-1 compression of video. Specifically, bit allocation for the pictures, adaptive DCT quantization, and pre-filtering strategies are covered by this patent.

U.S. Pat. No. 5,111,292 discloses an apparatus for separating compressed video data into a high priority stream and a low priority stream while U.S. Pat. No. 5,122,875 discloses both an apparatus for separating compressed video data into a high priority stream and a low priority stream and a method for transmitting, receiving and decoding these streams. U.S. Pat. No. 5,148,272, on the other hand, discloses circuitry for recombining, at the receiver, compressed video data which has been prioritized between high and low priorities.

U.S. Pat. No. 5,193,004 discloses a method for compressing even fields of interlaced video by creating a prediction for the even field using past and future odd fields, i.e., bi-directional field-based prediction. U.S. Pat. No. 5,212,742 discloses an architecture and a corresponding method for providing sufficient computing power for real-time decompression of moving video images. On the other hand, U.S. Pat. No. 5,212,549 discloses an apparatus as the receiver for detecting and concealing transmission errors in the compressed video data.

U.S. Pat. Nos. 5,185,819 and 5,146,325 disclose methods for reducing the timing latency with respect to image display on a receiver when the receiver is turned on or when the channel is changed. The '819 patent further discloses techniques for reducing the effect of errors, which is accomplished by compressing the odd fields of the video signal as one IBBP type sequence and the even fields of the video signal as a different IBBP sequence. The "I" fields of the even sequence do not follow the "I" fields of the odd sequence, instead these fields are offset by a distance equal to half the number of pictures in a single Group of Pictures.

U.S. Pat. No. 5,168,356 provides a method for segmenting encoded video data into transport blocks for signal transmission. U.S. Pat. No. 5,247,347 is related to a public switched telephone network configuration for video distribution in accordance with MPEG standards.

U.S. Pat. No. 5,227,878 discloses a method for compressing and decompressing interlaced video. Input video is analyzed and a decision is made to motion estimate and compensate a 16(H)×16(V) block as an entity, or as two 16×8 frame blocks or two 16×8 field blocks. The coding mode yielded by the analyzer also affects the quantization table chosen for the DCT coefficients, the scanning order to the quantized DCT coefficients, and the choice of variable length code table which is used to further compress the scanned coefficients. All the stages of compression are made to be adaptive based on block type, e.g., intra/inter, frame/field, forward/backward predicted. The motion processing described in this patent is already covered by the draft MPEG-2 standard.

U.S. Pat. No. 5,241,383 discloses a method for bit allocation and quantizer adjustment to obtain good quality video at the specified bit rate.

SUMMARY OF THE INVENTION

The principal purpose of the present invention is to provide a flexible motion estimation and compensation system architecture in a video processing system.

An object of the present invention is to provide a flexible motion estimation and compensation system architecture which provides for both draft MPEG-2 (Motion Picture Experts Groups) standard and non-standard digital video compression. The draft MPEG-2 standard is set forth in "Information Technology-Generic Coding of Moving Pictures and Associated Audio", Recommendation H.26x, ISO/IEC xxxx, Third Working Draft, New York, Jul. 16, 1993, which document is incorporated herein by reference for all purposes.

It will be appreciated that conventional MPEG-2 encoder architectures by frame-structure processing of input video signals. Another object of the present invention is to provide a flexible motion estimation and compensation system architecture which can be reconfigured dynamically to operate on either video frames or video fields.

Still another object of the present invention is to provide a flexible motion estimation and compensation system architecture which permits the dynamic allocation of available processing power to thereby either provide a sophisticated temporal processing mode of operation or to increase the size of the motion estimation search window. It will be noted that this latter feature of the present invention is critical to efficient compression of fast moving sequences.

These and other objects, features and advantages of the present invention are provided in a video signal processor, by a motion vector estimation system having a first operating mode for performing frame-structure processing and a second operating mode for field-structure processing. The system is characterized in that it includes N motion estimator units, each of the units receiving two respective time separated data blocks, wherein N units are operating during the first operating mode, wherein M of the N units are operating during the second operating mode and wherein (N–M) units provide motion estimating processing outside of an area of an image represented by the data blocks. According to one aspect of the present invention, N is an integer greater than 2 while M is an integer less than N.

These and other objects, features and advantages of the invention are disclosed in or apparent from the following description of preferred embodiments.

BRIEF DESCRIPTION OF THE DRAWINGS

The preferred embodiments are described with reference to the drawings in which like elements are denoted by like or similar numbers and in which:

FIGS. 3b and 3c provide additional block diagrams which are useful in explaining the operation of the several motion estimating unit illustrated in FIG. 3a;

DESCRIPTION OF THE PREFERRED EMBODIMENTS

Laboratory studies have shown that different kinds of video sequences would benefit from different levels of processing. For example, high motion interlaced sources would benefit by using field-structure processing. On the other hand, slow moving highly detailed sequences would profit from bi-directional frame-structure processing and coding. Within frame-structure processing, some frame blocks could benefit from field-based motion vectors. Therefore, the capability of using different processing modes for different kinds of sources appears to be advantageous for any video encoding system. The different modes advantageously can be accommodated within the draft MPEG-2 syntax if changes in mode are made from GOP to GOP, i.e., all the frame/fields in a GOP would have the same processing structure and prediction mode.

In principle, by using separate parallel hardware modules, all the different modes can be accommodated. It will be appreciated, however, that this would be very expensive. In accordance with the present invention, a parallel processing architecture advantageously can be reconfigured on-line for the different modes of processing. Changes in the mode are permitted from one GOP to the next so that the best processing mode for a given source can be used. The available processing power can be allocated to either increasing the motion estimation search window or to operating at a higher processing level. Thus, larger search windows with field-structure processing can be used for high motion sequences, while complex slow moving scenes are processed in the frame-structure mode, bi-directionally, with smaller window sizes.

It should be mentioned that the actual algorithms and circuitry used to decide the best processing mode for a particular video sequence are many; preferably switching between operating modes is performed according to a measure of the distortion resulting from video compression, although other parameters advantageously can be used. The flexible processor according to the present invention advantageously has applications in both off-line and on-line video encoding.

Having laid the foundation regarding the present invention, a detailed description of the present invention will now be provided.

Figure 2:
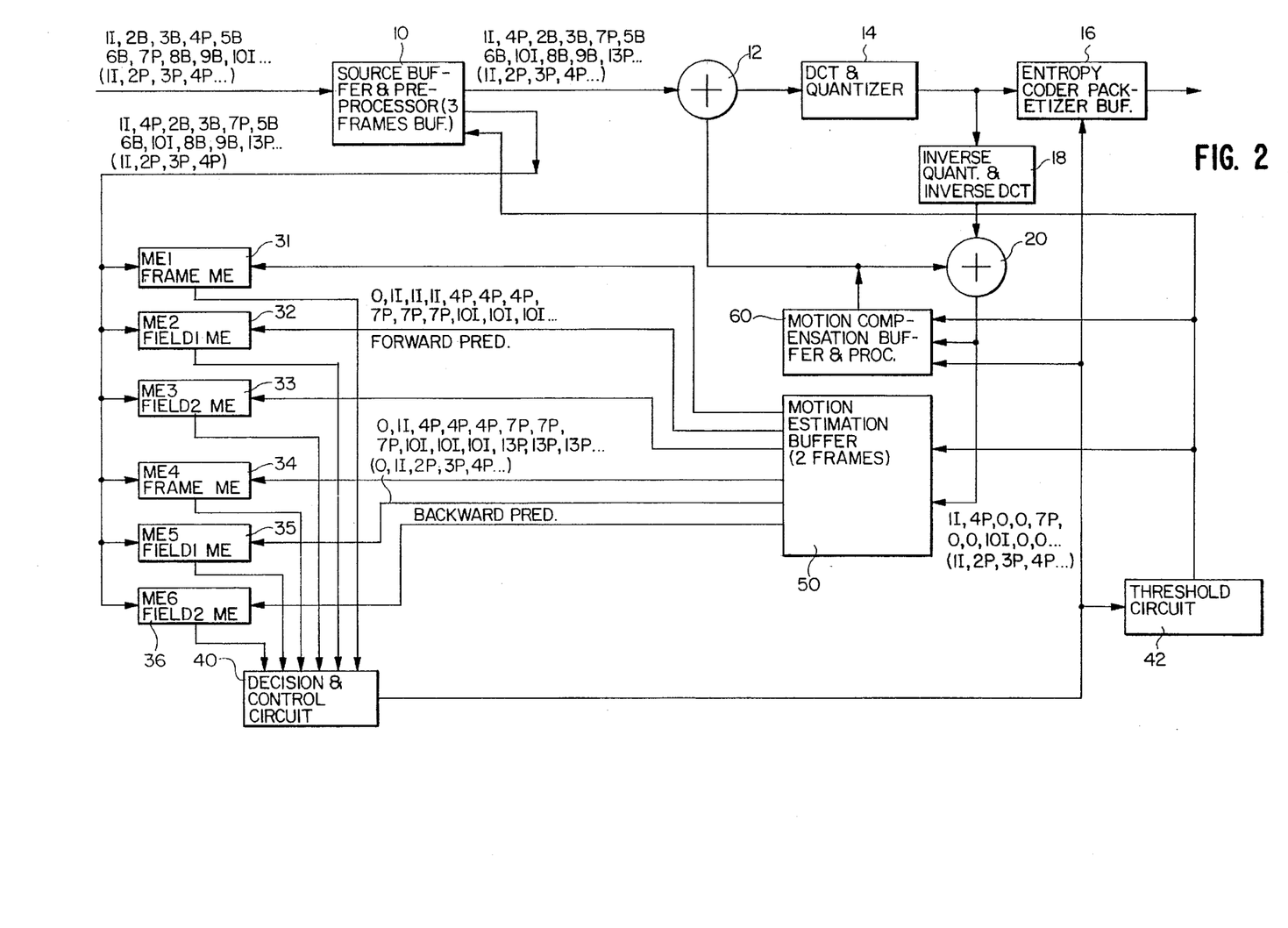
FIG. 2 is a high level block diagram of a motion estimation and compensation according to the present invention.

Referring to FIG. 2, a unified motion estimation and compression circuit according to the present invention will now be described. The circuitry includes a source buffer and pre-processor 10 which is connected to discrete cosine transform (DCT) and quantizer circuit 14 via subtractor 12. The output of DCT quantizer 14 is provided to an entropy coder, packitizer and buffer circuit 16 and to an inverse quantizer and inverse DCT circuit 18. The output of DCT quantizer 14 is inverted and recovered by circuit 18 and then provided to an adder 20. The output of adder 20 is provided to both a motion compensation buffer and processor 60 and a motion estimation buffer 50. It will be noted that the output of buffer 60 is provided to both adder 20 and subtractor 12.

Preferably, motion estimation units 31–36 are commonly connected to source buffer and pre-processor 10. Motion estimation units 31–36 advantageously are connected to motion estimation buffer 50, which receives recovered video information output by adder 20. Each of motion estimation units 31–36 are also connected to a common decision and control circuit 40, which provides output signals to threshold circuit 42, motion compensation buffer and processor 60 and entropy coder, packitizer and buffer 16. Threshold circuit 42, in turn, provides control signals to motion estimation buffer 50, motion compensation buffer and processor 60 and source buffer pre-processor 10.

Figure 3A:
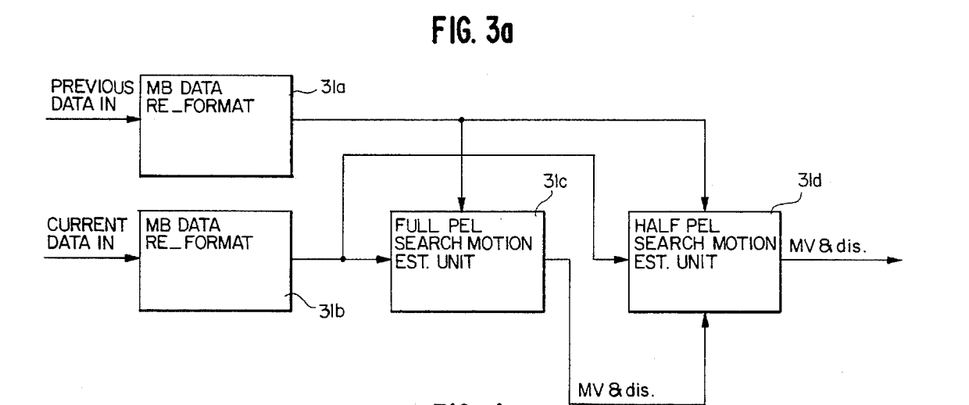
FIG. 3a provides a high level block diagram which is useful in explaining the operation of the several motion estimating units included in the circuitry of FIG. 2.
Figure 3B:
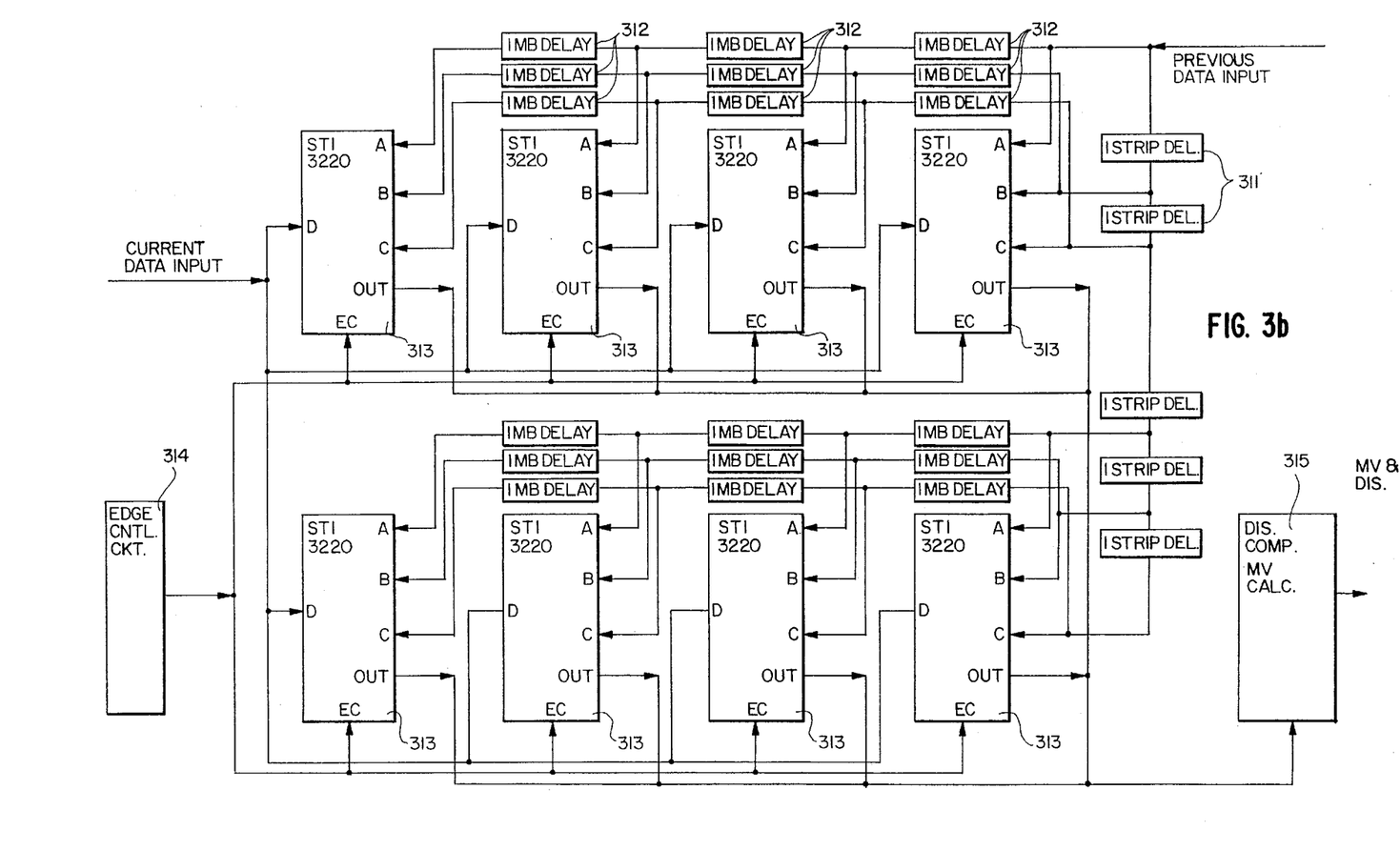
Figure 3C:
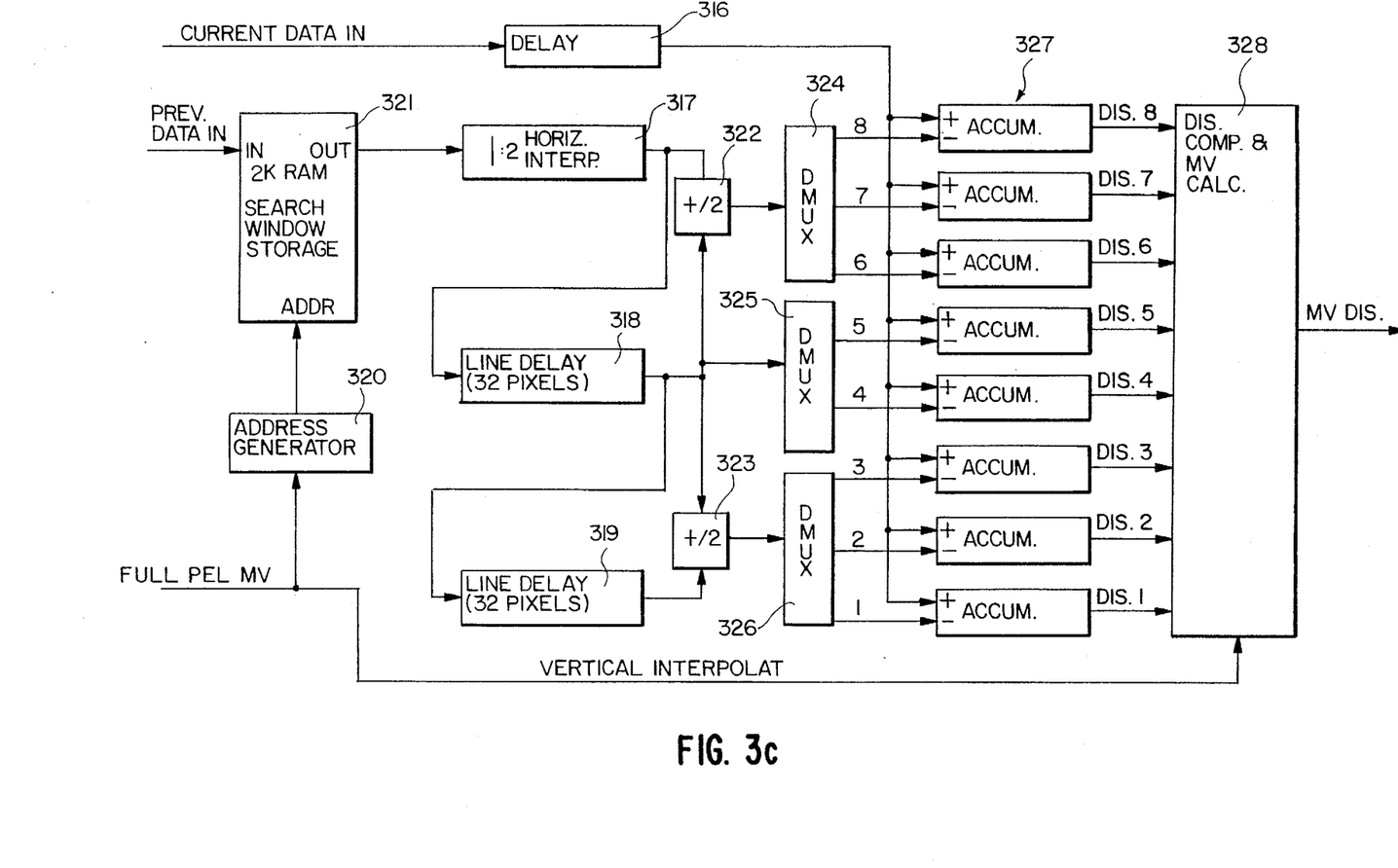

FIGS. 3a through 3c illustrate one of the motion estimation units in greater detail. With respect to FIG. 3a, which is a high level block diagram of a motion estimation unit, e.g., unit 31, previous data from buffer 50 is applied to a macro block data reformat circuit 31a while the current data from buffer 10 is provided to a macro block data reformat circuit 31b. Each of these circuits is connected with the input of a full pel search motion estimation unit 31c and to half pel search motion estimation unit 31d. It will be noted that the output of unit 31c is provided to unit 31d to influence address, as described in greater detail below.

Each of the full pel search motion estimation units 31c–36c is constructed in an identical manner and includes a number of one-strip delay buffer 311, macro-block (MB) delay units 312, motion estimation chips 313, an edge control circuit 314 and an output circuit 315. The operation of circuits 31c–36c is described in greater detail below. However, it should be pointed out, that those of ordinary skill in the art will easily appreciate construction and operation of motion estimation units 31–36. In particular, the half-pixel motion estimation procedure is well know to those of ordinary skill in the art and will not be described or discussed further in the interest of brevity.

Each of the half pel search motion estimation units 31d–36d includes a delay block 316 for delaying the current data for a predetermined period of time. In addition, the previous data is provided to a window storage circuit 321, which circuit is controlled by address generator 320 from data provided by unit 31c. Circuit 321 outputs pixel data to a horizontal interpolation circuit 317 which in turn provides signals to series connected 32 pixel line delay units 318 and 319. The outputs of circuit 317 and 318 are provided to a mean calculator 322 and the output of line delay units 318 and 31 9 are provided to mean calculator 323. Demodulator circuits 324, 325 and 326 receive data from mean calculator 322, line delay unit 318 and mean calculator 323, respectively. Demodulator circuits 324 through 326 are connected to accumulators, generally denoted 327, each of which generate a respective distortion signal to distortion computation and motion vector calculation circuit 328.

Figure 4:
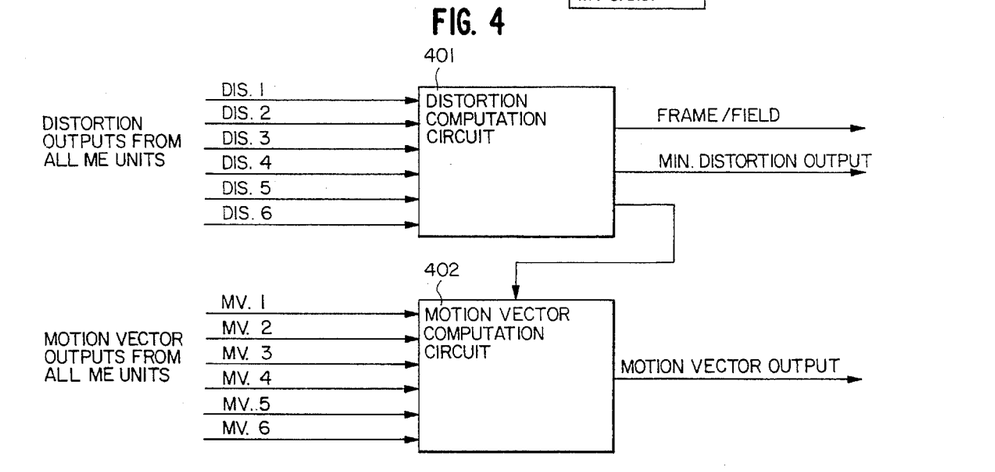
FIG. 4 is a high level block diagram which is useful in detailing the operation of the control circuitry of the present invention shown in FIG. 2.

Referring again to FIG. 2. decision and control circuit 40 includes a distortion computation circuit 401 and a motion vector computation circuit 402. Motion vector computation circuit 402 advantageously provides control signals to motion compensation buffer and processor 60 and to entropy coder, packitizer and buffer 16. Preferably, the output of distortion computation circuit 401, constructed as shown in FIG. 4, is used to identify a minimum distortion output. When this output is provided or applied to threshold circuit 42, a comparison with respect to the output can be provided.

Advantageously, the output of threshold circuit 42 can be supplied to motion compensation buffer and processor 60, motion estimation buffer 50 and source buffer pre-processor 10 to thereby switch the circuitry of FIG. 2 from frame-structure processing to field-structure processing and vice versa.

It will be noted that in each of the inputs to and distortion computation 401 and motion vector computation circuit 402 are provided by circuit 328 of the respective motion estimation units 31–36 shown in FIGS. 3a–3c.

With the basic structure of the motion vector estimation and compensation circuit as described, the operation of the system will now be described in detail.

Referring again to the high level block diagram of an MPEG-2 encoder with the flexible temporal processor shown in FIG. 2, the first buffer/pre-processing unit 10 shuffles the frame/fields so that they can be processed in the right order. The order of processing in the bi-directional mode is shown at the right of the pre-processor unit (the numbers represent the input frame order, and I, P, B represent the intra frame, predicted frame and bi-directional frame, respectively). The processing order in the forward prediction mode is shown within parentheses in FIG. 2.

There are a total of six basic motion estimation units 31–36, each one performs block-matching based motion estimation for the input data block. Motion estimation unit 31 performs forward prediction on the current frame while motion estimation unit 32 and motion estimation unit 33 perform estimation on the fields of the current frame. This permits field motion estimation, i.e., 2 motion vectors in a frame block, within frame-structure processing. Similarly, motion estimation unit 34, motion estimation unit 35 and motion estimation unit 36 perform the frame/field motion estimation in the backward direction.

The operation of motion estimation units 31–36 can best be understood with reference to Table 1. It will be noted that, with respect to frame-structure bi-directional processing, the input sequence of frames to the pre-processor is 1I, 2B, 3B, 4P, 5B, 6B, 7P, . . . , and so on. On the other hand, the input sequence of frames to the motion estimation unit is 1I, 4P, 2B, 3B, 7P, 5B, 6B, . . . , etc. For field-structure forward prediction processing, the input sequence of the fields to the pre-processor and motion estimation unit is 1I, 2P, 3P, 4P, 5P, 6P, 7P, . . . , etc. It should also be noted that search areas are contiguous blocks of pixels, each of nominal size—32/31 horizontally, and–16/+15 vertically.

TABLE 1

| | Frame Structure Bi-directional Prediction | | Field Structure Forward Prediction | |
|---|---|---|---|---|
| ME | Left Input | Right Input | Left Input | Right input |
| 1 | 3B-frame 16 × 16 block | 1I-frame 16 × 16 block | 3P-field 16 × 16 block | 2P-field 16 × 16 block-from Search Area-1 |
| 2 | 16 × 8 block corresponding to field1 of 3B-frame | 16 × 8 block corresponding to field1 of 1I-frame | 3P-field 16 × 16 block | 2P-field 16 × 16 block-from Search Area-2 |
| 3 | 16 × 8 block corresponding to field2 of 3B frame | 16 × 8 block corresponding to field2 of 1I frame | 3P-field 16 × 16 block | 2P-field 16 × 16 block-from Search Area-3 |
| 4 | 3B-frame 16 × 16 block | 4P-frame 16 × 16 block | 3P-field 16 × 16 block | 1I-field 16 × 16 block-from |

TABLE 1-continued

| | Frame Structure Bi-directional Prediction | | Field Structure Forward Prediction | |
|---|---|---|---|---|
| ME | Left Input | Right Input | Left Input | Right input |
| 5 | 16 × 8 block corresponding to field1 of 3B frame | 16 × 8 block corresponding to field1 of 4P-frame | 3P-field 16 × 16 block | Search Area-1 1I-field 16 × 16 block-from Search Area-2 |
| 6 | 16 × 8 block corresponding to field2 of 3B frame | 16 × 8 block corresponding to field2 of 4P-frame | 3P-field 16 × 16 block | 1I-field 16 × 16 block-from Search Area-3 |

The high-level block diagram of FIG. 3a illustrates one of the motion estimation units 31–36 in greater detail. As shown in FIG. 3b, several off-the-shelf (OTS) motion estimation chips 313 are combined in e.g., full pel search motion estimation unit 31c so as to provide an increased search window. In this system design multiple Thomson STI-3220 motion estimation unit chips advantageously are used. It will be appreciated that a similar design could be achieved if a different OTS chip were to be used. While each STI-3220 chip provides a search window of −8/+7, the combination of multiple chips 313 in motion estimation unit 31 yields a search window of −32/31 pixels in the horizontal direction and −16/+15 pixels in the vertical direction. It will be appreciated that combining these chips 313 requires additional line buffers and glue logic. The edge control circuit 314 contains special logic to take care of the image boundaries, as will be appreciated by those of ordinary skill in the art. The distortion computation and motion vector calculation unit, i.e., output circuit 315, receives the best motion vectors and minimum distortions from each motion estimation unit chip 313 and, in turn, computes the lowest distortion and outputs this distortion and the motion vector corresponding to the lowest distortion. This concentration of multiple motion estimation unit chips to obtain a larger search window is well known to those of ordinary skill in the art.

The decision and control circuit of FIG. 2 is shown in greater detail in FIG. 4. Circuit 40 takes in all the outputs from the half pel search motion estimation units 31d–36d, e.g., minimum distortions and associated motion vectors, and decides whether frame or field motion vectors are to be used. In either case, the best motion vector(s) and the corresponding distortion is output. It will be appreciated that this circuit 40 can be combined with circuit 42, so that the combined circuitry advantageously decide on the mode of processing to be used for a particular GOP.

The other key components of the processor shown in FIG. 2 are the motion estimation unit buffer 50 and motion compensation buffer and processor 60. The buffer 50 contains two luminance frames, which are the maximum required for any mode of processing, as well as logic to control the addressing of buffer 50. This enables reconfiguration of the search modes of the processor so as to accomplish, for example, bi-directional frame motion vector estimation with a certain sized search window, or unidirectional field-based motion estimation with a much larger search window. Buffer 60 advantageously contains two luminance and two chrominance frames and performs pixel addressing and half-pixel motion compensation.

It will be appreciated that, while the RAM (random access memory) portion of buffers 50 and 60 could be combined to reduce costs, the resulting multiple access requirements would make the architecture much more difficult and, subsequently, much more expensive. Separation of the buffers 50 and 60 also makes it possible to improve and upgrade the motion estimation unit stage without requiring a major change in the input buffer stage.

The flexible processor architecture according to the present invention facilitates all modes of MPEG-2 processing. In addition, the processor can be reconfigured on the fly to increase the search window at the cost of simpler processing. The architecture is particularly suited to high quality real-time and offline video compression applications.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. In a video signal processor, a motion vector estimation system having a first operating mode for performing frame-structure processing and a second operating mode for field-structure processing, said system characterized in that said system comprises N motion estimator units, where N is an integer greater than 2, each of said units receiving two respective time separated data blocks, wherein N units are operating during said first operating mode, wherein M, where M is an integer less than N, of said N units are operating during said second operating mode and wherein (N–M) units provide motion estimating processing outside of an area of an image represented by said data blocks.

2. The motion vector estimation system as recited in claim 1, wherein said system is adaptively switched between said first operating mode and said second operating mode responsive to respective signals generated by said N units.

3. The motion vector estimation system as recited in claim 2, wherein said respective signals are indicative of distortion between said data blocks in each of said N units.

4. In a video signal processor, a motion vector estimation system having a first operating mode for performing frame-structure processing and a second operating mode for field-structure processing, said system characterized in that said system comprises:

N means for motion estimating, wherein N is an integer greater than 2, wherein each of said motion estimating means receives two respective time separated data blocks, wherein N of said motion estimating means are operating during said first operating mode, wherein M, where M is an integer less than N, of said N motion estimating means are operating during said second operating mode, and wherein (N–M) of said motion estimating means provide motion estimating processing outside of an area of an image represented by said data blocks.

5. The motion vector estimation system as recited in claim 4, wherein said system is adaptively switched between said first operating mode and said second operating mode responsive to respective signals generated by said N motion estimating means.

6. The motion vector estimation system as recited in claim 5, wherein said respective signals are indicative of distortion between said data blocks in each of said N motion estimating means.

* * * * *